United States Patent
Kikuchi et al.

(10) Patent No.: US 9,742,299 B2
(45) Date of Patent: Aug. 22, 2017

(54) INSULATED SYNCHRONOUS RECTIFICATION DC/DC CONVERTER

(71) Applicant: ROHM CO., LTD., Ukyo-Ku, Kyoto (JP)

(72) Inventors: Hiroki Kikuchi, Kyoto (JP); Ryo Shimizu, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 14/965,245

(22) Filed: Dec. 10, 2015

(65) Prior Publication Data

US 2016/0181934 A1 Jun. 23, 2016

(30) Foreign Application Priority Data

Dec. 17, 2014 (JP) .................................. 2014-255548

(51) Int. Cl.
*H02M 3/335* (2006.01)
*H02M 1/00* (2006.01)

(52) U.S. Cl.
CPC ... *H02M 3/33592* (2013.01); *H02M 3/33523* (2013.01); *H02M 2001/0035* (2013.01); *Y02B 70/1475* (2013.01); *Y02B 70/16* (2013.01)

(58) Field of Classification Search
None
See application file for complete search history.

(56) References Cited

U.S. PATENT DOCUMENTS

| 5,757,627 | A | 5/1998 | Faulk | |
|---|---|---|---|---|
| 6,191,965 | B1 * | 2/2001 | Matsumoto | H02M 3/33592 363/127 |
| 7,385,832 | B2 * | 6/2008 | Allinder | H02M 3/33592 363/127 |
| 7,440,298 | B2 | 10/2008 | Yang | |
| 9,001,532 | B2 | 4/2015 | Olivik et al. | |
| 2006/0018135 | A1 | 1/2006 | Yang et al. | |
| 2009/0091960 | A1 * | 4/2009 | Yang | H02M 1/08 363/127 |

(Continued)

FOREIGN PATENT DOCUMENTS

JP 2010074959 A 4/2010

OTHER PUBLICATIONS

US Non Final Office Action corresponding to U.S. Appl. No. 14/980,508, Issued: Nov. 21, 2016.

(Continued)

*Primary Examiner* — Jeffrey Gblende
(74) *Attorney, Agent, or Firm* — Cantor Colburn LLP

(57) ABSTRACT

A synchronous rectification controller is arranged on the secondary side of an insulated synchronous rectification DC/DC converter. The synchronous rectification controller controls a synchronous rectification transistor M. An automatic shutdown circuit judges, based on the voltage $V_{DS}$ across the synchronous rectification transistor, whether the operation mode of a primary-side controller is a burst mode or a non-burst mode. When judgment has been made that the operation mode is the burst mode, the automatic shutdown circuit instructs a driver to suspend the switching of the synchronous rectification transistor M.

20 Claims, 11 Drawing Sheets

(56) References Cited

U.S. PATENT DOCUMENTS

| | | | |
|---|---|---|---|
| 2010/0164456 A1* | 7/2010 | Oyama | H02M 3/156 |
| | | | 323/283 |
| 2014/0003096 A1 | 1/2014 | Deng | |
| 2014/0003097 A1* | 1/2014 | Sakurai | H02M 3/33507 |
| | | | 363/21.14 |
| 2014/0192565 A1* | 7/2014 | Wang | H02M 3/33592 |
| | | | 363/21.14 |
| 2014/0268914 A1 | 9/2014 | Wang et al. | |

OTHER PUBLICATIONS

USPTO Office Action corresponding to U.S. Appl. No. 14/980,508, Date of Mailing Mar. 7, 2017.
U.S. Advisory Action corresponding to U.S. Appl. No. 14/980,508; dated Jun. 15, 2017.

* cited by examiner

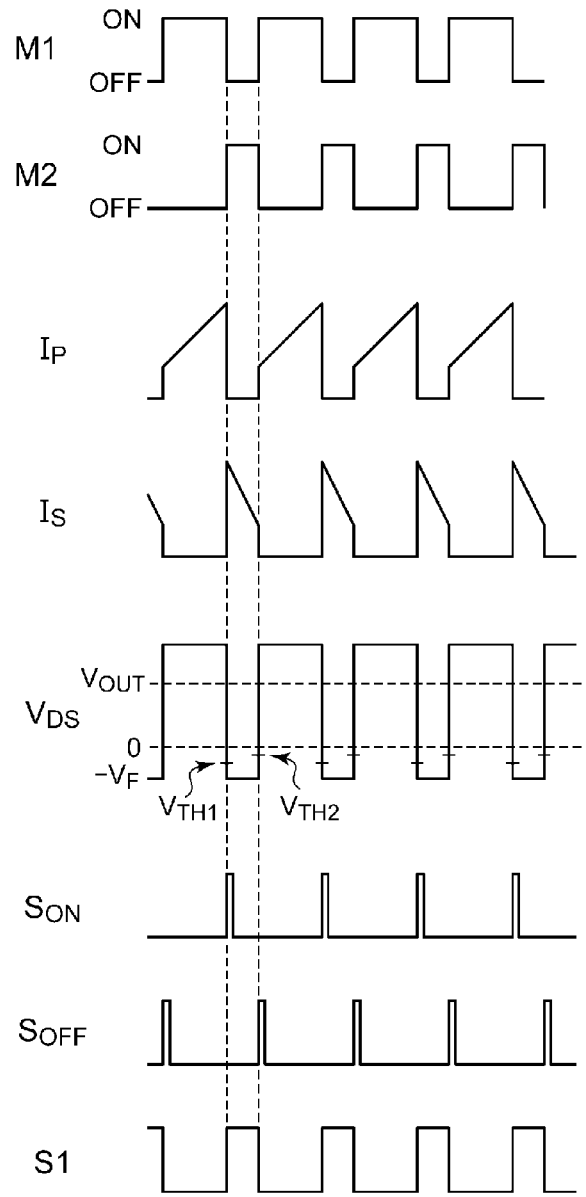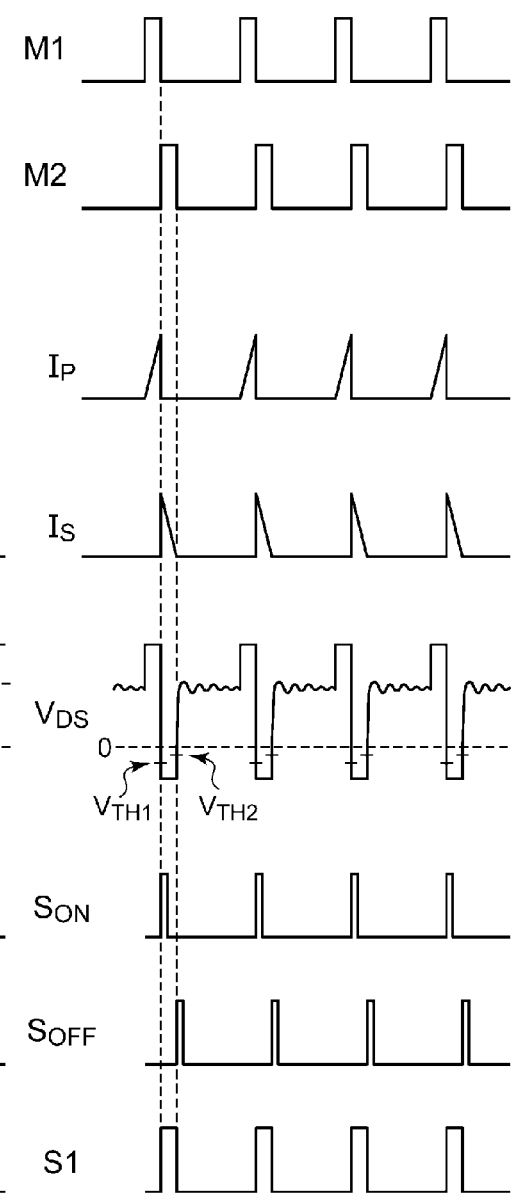

INSULATED SYNCHRONOUS RECTIFICATION DC/DC CONVERTER

CROSS-REFERENCE TO RELATED APPLICATIONS

This application is based upon and claims the benefit of priority from the prior Japanese Patent Application No. 2014-255548, filed Dec. 17, 2014, the entire contents of which are incorporated herein by reference.

BACKGROUND OF THE INVENTION

Field of the Invention

The present invention relates to an insulated synchronous rectification DC/DC converter.

Description of the Related Art

Various kinds of consumer electronics devices such as TVs, refrigerators, etc., each operate receiving commercial AC electric power from an external circuit. Also, electronic devices such as laptop computers, cellular phone terminals, and tablet PCs are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (AC/DC converter) that performs AC/DC conversion of commercial AC voltage. Alternatively, in some cases, such an AC/DC converter is built into an external power supply adapter (AC adapter) for such an electronic device.

FIG. 1 is a block diagram showing an AC/DC converter 100r investigated by the present inventor. The AC/DC converter 100r mainly includes a filter 102, a rectifier circuit 104, a smoothing capacitor 106, and a DC/DC converter 200r.

The commercial AC voltage $V_{AC}$ is input to the filter 102 via a fuse and an input capacitor (not shown). The filter 102 removes noise included in the commercial AC voltage $V_{AC}$. The rectifier circuit 104 is configured as a diode bridge circuit which performs full-wave rectification of the commercial AC voltage $V_{AC}$. The output voltage of the rectifier circuit 104 is smoothed by the smoothing capacitor 106, thereby generating a converted DC voltage $V_{IN}$.

An insulated DC/DC converter 200r receives the DC voltage $V_{IN}$ via an input terminal P1, steps down the DC voltage $V_{IN}$ thus received, and supplies an output voltage $V_{OUT}$ stabilized to the target value to a load (not shown) connected to an output terminal P2.

The DC/DC converter 200r includes a primary-side controller 202, a photocoupler 204, a feedback circuit 206, an output circuit 210, a synchronous rectification controller 300r, and other circuit components. The output circuit 210 includes a transformer T1, a diode D1, an output capacitor C1, a switching transistor M1, and a synchronous rectification transistor M2. The output circuit 210 has the same topology as those of typical synchronous rectification flyback converters, and accordingly description thereof will be omitted.

The switching transistor M1 connected to the primary winding W1 of the transformer T1 performs switching so as to step down the input voltage $V_{IN}$, thereby generating the output voltage $V_{OUT}$. With such an arrangement, the primary-side controller 202 adjusts the duty ratio of the switching of the switching transistor M1.

The output voltage $V_{OUT}$ of the DC/DC converter 200r is divided by means of resistors R1 and R2. The feedback circuit 206 includes a shunt regulator or an error amplifier that amplifies the difference between the divided voltage (voltage detection signal) $V_S$ and a predetermined reference voltage ($V_{REF}$) (not shown), and generates an error current $I_{ERR}$ that corresponds to the difference, which is drawn (as a sink current) via a light-emitting element (light-emitting diode) arranged on the input side of the photocoupler 204.

A feedback current $I_{FB}$ flows through a light-receiving element (phototransistor) on the output side of the photocoupler 204 according to the error current $I_{ERR}$ that flows on the secondary side. The feedback current $I_{FB}$ is smoothed by means of a resistor and a capacitor, and is input to a feedback (FB) terminal of the primary-side controller 202. The primary-side controller 202 adjusts the duty ratio of the switching transistor M1 based on the voltage (feedback voltage) $V_{FB}$ at the FB terminal.

The synchronous rectification controller 300r switches on and off the synchronous rectification transistor M2 in synchronization with the switching of the switching transistor M1. The synchronous rectification controller 300r generates a pulse signal in synchronization with the switching of the switching transistor M1. For example, when the switching transistor M1 turns off, a pulse generator sets the pulse signal to a first state (e.g., high level) configured as an instruction to turn on the synchronization transistor M2. When the current $I_S$ that flows through the secondary winding W2 becomes substantially zero in an on period of the synchronous rectification transistor M2, the synchronous rectification controller 300r sets the pulse signal to a second state (low level) configured as an instruction to turn off the synchronous rectification transistor M2. The above is the overall configuration of the AC/DC converter 100r.

As a result of investigating the switching converter 100r shown in FIG. 1, the present inventors have come to recognize the following problems.

In recent years, from the viewpoint of power saving, there is a great demand for such an AC/DC converter 100r having further reduced power consumption when it operates with a light load or otherwise operates without a load (which will be referred to as the "standby state"). In order to meet this demand, the DC/DC converter 200r operates in a so-called burst mode (which will also be referred to as the "PFM mode") in the standby state. In the burst mode, the primary-side controller 202 switches on and off the switching transistor M1 once or otherwise several times such that the output voltage $V_{OUT}$ becomes greater than the target level, and suspends the switching of the switching transistor M1 until the output voltage $V_{OUT}$ drops to a lower limit level determined according to the target level of the output voltage $V_{OUT}$. Such an arrangement reduces the electric power used to switch on and off the switching transistor M1 (the electric power required to charge and discharge the gate capacitance of the switching transistor M1, for example), thereby providing high-efficiency AC/DC conversion.

However, there appears to be no end to the demand for reducing power consumption, and so the DC/DC converter 200r is required to provide further reduced power consumption.

SUMMARY OF THE INVENTION

The present invention has been made in order to solve such a problem. Accordingly, it is an exemplary purpose of an embodiment of the present invention to provide a DC/DC converter having reduced power consumption.

An embodiment of the present invention relates to a synchronous rectification controller that is arranged on a secondary side of an insulated synchronous rectification DC/DC converter, and that controls a synchronous rectification transistor. The synchronous rectification controller comprises: a pulse generator that generates a pulse signal configured as an instruction to switch on and off the synchronous rectification transistor based on at least a voltage across the synchronous rectification transistor; a driver that switches on and off the synchronous rectification transistor according to the pulse signal; and an automatic shutdown circuit that judges, based on the voltage across the synchronous rectification transistor, whether a primary-side controller that controls a switching transistor of the DC/DC converter provided at the primary side is operating in a burst mode or a non-burst mode, and that instructs the driver to suspend switching of the synchronous rectification transistor when judgment is made that an operation mode of the primary-side controller is the burst mode.

A voltage occurs across the synchronous rectification transistor according to the on/off operation of the =switching transistor at the primary side. Accordingly, judgment of whether or not the switching transistor is switching on and off can be made based on the voltage across the synchronous rectification transistor. Thus, judgment can be made of whether the operation mode is the burst mode or the non-burst mode. With such an embodiment, in the burst mode operation, the switching of the synchronous rectification transistor is suspended. In this state, the secondary-side circuit operates as a diode rectifier circuit. Thus, such an arrangement provides reduced switching loss, thereby providing reduced power consumption.

Also, when judgment has been made that the operation mode is the burst mode, the automatic shutdown circuit may shut down at least a part of a circuit block thereof.

By shutting down a part of the synchronous rectification controller in addition to suspending the switching of the secondary-side circuit, such an arrangement is capable of reducing the operation current of the synchronous rectification controller, thereby providing further reduced power consumption.

Also, the automatic shutdown circuit may judge the operation mode of the primary-side controller based on the pulse signal generated according to the voltage across the synchronous rectification transistor.

The pulse signal is generated in response to the switching of the switching transistor. Accordingly, by monitoring the pulse signal, such an arrangement is capable of judging whether or not the switching transistor is performing switching. With such an embodiment, by predicting the operation mode of the primary-side circuit based on the pulse signal, such an arrangement has a minimal requirement of an additional circuit configured to judge the operation mode.

Also, when a predetermined first time period continues in a state in which the pulse signal is not generated, the automatic shutdown circuit may judge that the operation mode is the burst mode.

In this case, a judgment threshold used to judge whether the operation mode is the burst mode or the non-burst mode may be set according to the length of the first time period.

Also, when a predetermined number of the pulse signals are continuously generated, the automatic shutdown circuit may judge that the operation mode is the non-burst mode.

Also, when a state in which the pulse signal is continuously generated continues for a second time period, the automatic shutdown circuit may judge that the operation mode is the non-burst mode.

Also, the automatic shutdown circuit may judge the operation mode of the primary-side controller based on a comparison result obtained by comparing the voltage across the synchronous rectification transistor with at least one threshold voltage.

By setting at least one threshold voltage to a suitable value, the comparison result indicates at least one from among turn-on and turn-off of the switching transistor. Accordingly, such an arrangement is capable of judging, based on the comparison result, whether or not the switching transistor is switching on and off. Thus, such an arrangement is capable of judging the operation mode of the primary-side controller.

Also, when a transition of a signal indicative of the comparison result does not occur for a predetermined first time period, the automatic shutdown circuit may judge that the operation mode is the burst mode.

Also, when a transition of a signal indicative of the comparison result continuously occurs for a predetermined number of times, the automatic shutdown circuit may judge that the operation mode is the non-burst mode.

Also, when a transition of a signal indicative of the comparison result continuously occurs for a predetermined second time period, the automatic shutdown circuit may judge that the operation mode is the non-burst mode.

Also, the automatic shutdown circuit may comprise: a first detection circuit that asserts a first detection signal when judgment has been made that the operation mode is the burst mode; a second detection circuit that asserts a second detection signal when judgment has been made that the operation mode is the non-burst mode; and an output circuit that generates a shutdown signal having a state that transits according to the first detection signal and the second detection signal.

Also, the output circuit may comprise a flip-flop.

Also, the first detection circuit may comprise: a capacitor having one end supplied with a fixed electric potential; a current source that supplies a current to the capacitor; a discharge circuit that discharges the capacitor according to the pulse signal; and a comparator that compares a voltage across the capacitor with a predetermined threshold voltage, and that asserts the first detection signal when the voltage across the capacitor exceeds the threshold voltage.

Such an arrangement is capable of detecting whether or not a first time period that corresponds to the threshold voltage continues in a state in which the pulse signal is not generated. Thus, such an arrangement is capable of detecting the burst mode.

Also, the second detection circuit may comprise a counter that counts the pulse signal, and that is reset when the first detection signal is asserted. Also, when a count value of the counter reaches a predetermined value, the second detection signal may be asserted.

Such an arrangement is capable of detecting that a predetermined number of pulse signals continuously occurs, thereby detecting the non-burst mode.

Also, when the voltage across the synchronous rectification transistor crosses a first threshold voltage, the pulse generator may set the pulse signal to an on level configured as an instruction to switch on the synchronous rectification transistor. Also, when the voltage across the synchronous rectification transistor crosses a second threshold voltage, the pulse generator may set the pulse signal to an off level configured as an instruction to switch off the synchronous rectification transistor.

The synchronous rectification controller according to an embodiment may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

Another embodiment of the present invention relates to an insulated synchronous rectification DC/DC converter. The DC/DC converter comprises: a transformer comprising a primary winding and a secondary winding; a switching transistor connected to the primary winding of the transformer; a synchronous rectification transistor connected to the secondary winding of the transformer; a photocoupler; a primary-side controller that is connected to an output side of the photocoupler, and that switches on and off the switching transistor according to a feedback signal received from the photocoupler; any one of the aforementioned synchronous rectification controllers that control the synchronous rectification transistor; and a feedback circuit that is connected to an input side of the photocoupler, and that generates an error current that corresponds to an output voltage of the DC/DC converter.

The DC/DC converter may be configured as a flyback converter or a forward converter.

Yet another embodiment of the present invention relates to a power supply apparatus (AC/DC converter). The power supply apparatus comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to a load.

Yet another embodiment of the present invention relates to an electronic device. The electronic device comprises: a load; a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the DC/DC converter that steps down the DC input voltage, and that supplies the DC input voltage thus stepped down to the load.

Yet another embodiment of the present invention relates to an AC adapter. The AC adapter comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage so as to generate a DC output voltage.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B are operation waveform diagrams showing the operations of a pulse generator in a continuous mode and in a discontinuous mode, respectively;

DETAILED DESCRIPTION OF THE INVENTION

The invention will now be described by reference to the preferred embodiments. This does not intend to limit the scope of the present invention, but to exemplify the invention.

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
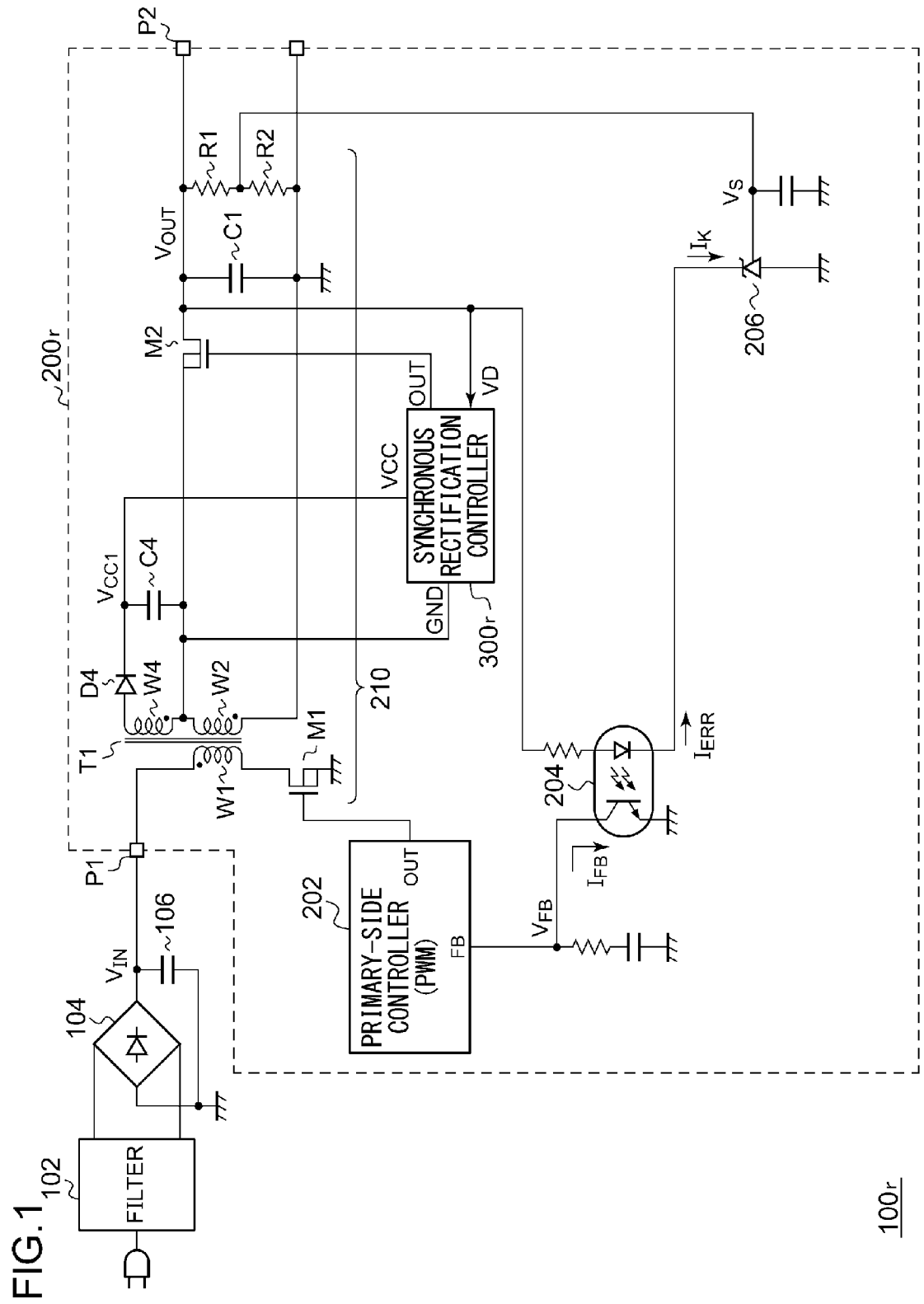
FIG. 1 is a block diagram showing a basic configuration of an AC/DC converter investigated by the present inventor.
Figure 2:
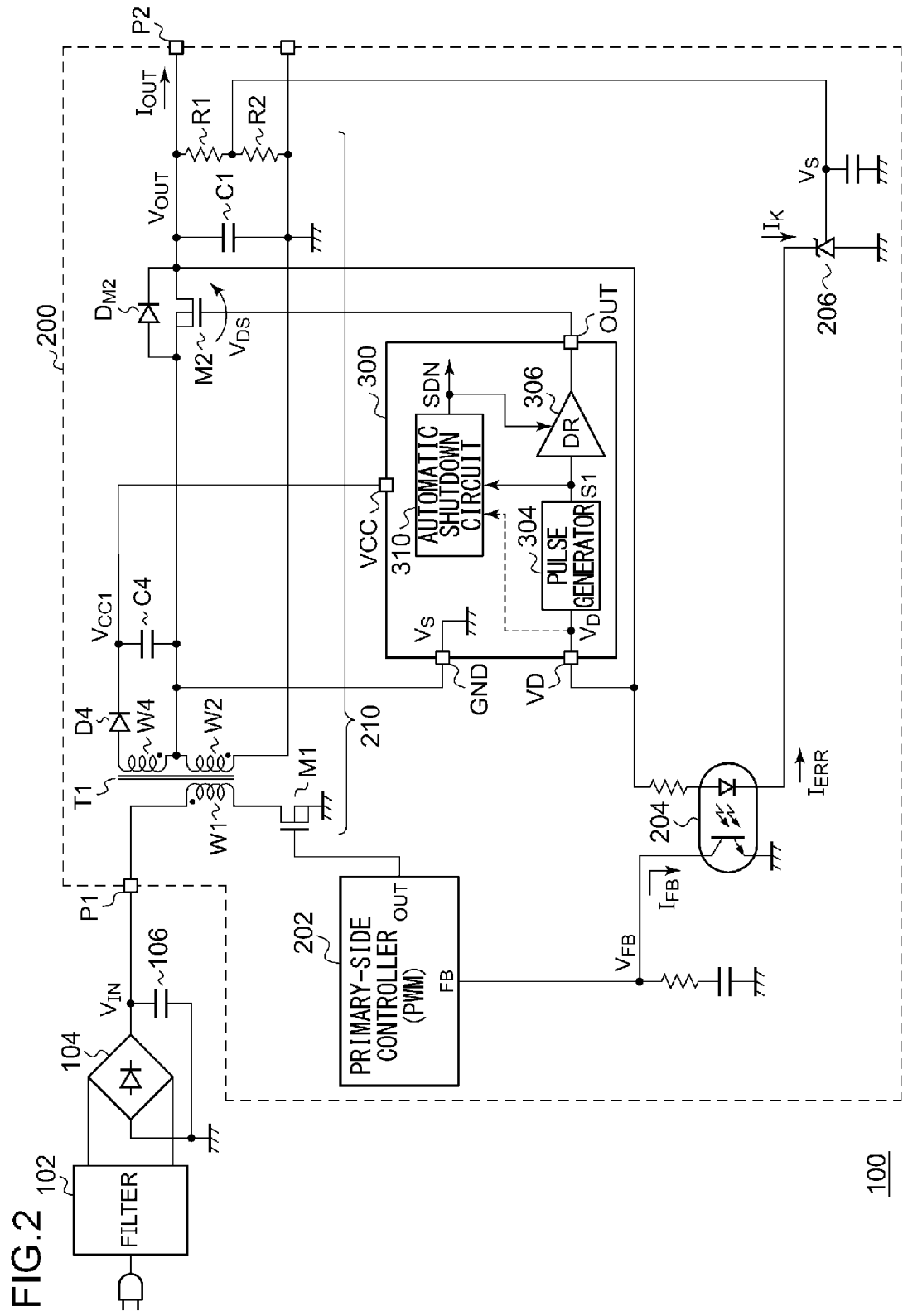
FIG. 2 is a circuit diagram showing a DC/DC converter including a synchronous rectification controller according to an embodiment.

FIG. 2 is a circuit diagram showing a DC/DC converter 200 including a synchronous rectification controller 300 according to an embodiment. An AC/DC converter 100 and the DC/DC converter 200 respectively have the same basic configurations as those of the AC/DC converter 100r and the DC/DC converter 200r shown in FIG. 1. A primary-side controller 202 is configured to operate in the burst mode when the DC/DC converter 200 operates with a light load or otherwise with no load.

The synchronous rectification controller 300 includes a power supply (VCC) terminal, a switching output (OUT)

terminal, a drain voltage (VD) terminal, and a ground (GND) terminal, and is configured as a function IC (Integrated Circuit) integrated on a single semiconductor substrate. The synchronous rectification controller 300 may be housed in the same package together with a synchronous rectification transistor M2 so as to form a single monolithically integrated module.

An auxiliary winding W4 of a transformer T1, a diode D4, and a capacitor C4 form an auxiliary converter, which generates a DC voltage $V_{CC1}$ that is higher than an output voltage $V_{OUT}$. The DC voltage $V_{CC1}$ is supplied to the VCC terminal. The GND terminal of the synchronous rectification controller 300 is connected to the source of the synchronous rectification transistor M2.

The OUT terminal is connected to the gate of the synchronous rectification transistor M2. The VD terminal is provided in order to monitor a voltage (drain-source voltage) across the synchronous rectification transistor M2. Specifically, the drain voltage $V_D$ of the synchronous rectification transistor M2 is input to the VD terminal.

The synchronous rectification controller 300 includes a pulse generator 304, a driver 306, and an automatic shutdown circuit 310.

The pulse generator 304 generates a pulse signal S1 configured as an instruction to switch on and off the synchronous rectification transistor. For example, when the switching transistor M1 turns off, the pulse generator 304 sets the pulse signal S1 to a first state (e.g., high level) configured as an instruction to turn on the synchronous rectification transistor M2. When the current $I_S$ that flows through the secondary winding W2 becomes substantially zero in the on period of the synchronous rectification transistor M2, the pulse generator 304 sets the pulse signal S1 to a second state (low level) configured as an instruction to turn off the synchronous rectification transistor M2.

During the on period of the switching transistor M1, a positive voltage $V_{DS}$ occurs as the drain-source voltage of the synchronous rectification transistor M2. Specifically, during the on period of the switching transistor M1, the source voltage of the synchronous rectification transistor M2 is represented by $(-V_{IN} \times N_S/N_P)$, and the drain voltage is represented by $V_{OUT}$. Thus, the positive voltage $V_{DS}$ is represented by $(V_{OUT}+V_{IN} \times N_S/N_P)$. Here, $N_P$ and $N_S$ represent the number of turns of the primary winding W1 and the number of turns of the secondary winding W2, respectively.

When the switching transistor M1 turns off, the current $I_S$ flows from the source to the drain of the synchronous rectification transistor M2. In this state, the drain-source voltage becomes a negative voltage. As the current $I_S$ becomes small, the absolute value of the drain-source voltage $V_{DS}$ becomes small. Eventually, when the current $I_S$ becomes substantially zero, the drain-source voltage $V_{DS}$ also becomes substantially zero (discontinuous mode). Alternatively, in the continuous mode, when the switching transistor M1 is turned on, the secondary current $I_S$ becomes substantially zero. In this state, the drain-source voltage $V_{DS}$ also becomes substantially zero. Using this mechanism, the pulse generator 304 generates the pulse signal S1 based on the drain voltage (drain-source voltage) of the synchronous rectification transistor M2. It should be noted that the pulse generator 304 may preferably be configured using known techniques. Also, such an arrangement by no means restricts the control operation and the configuration of the synchronous rectification transistor M2.

The driver 306 switches on and off the synchronous rectification transistor M2 according to the pulse signal S1.

The automatic shutdown circuit 310 judges, based on the voltage (drain-source voltage $V_{DS}$) across the synchronous rectification transistor M2, whether the primary-side controller 202 is operating in the burst mode or the non-burst mode. When judgment is made that the operation mode of the primary-side controller 202 is the burst mode, the automatic shutdown circuit 310 instructs the driver 306 to suspend the switching of the synchronous rectification transistor M2. The automatic shutdown circuit 310 generates a shutdown signal (which will also be referred to as a "sleep signal") SDN which is set to a first state (e.g., high level) when judgment is made that the operation mode is the burst mode, and which is set to a second state (e.g., low level) when judgment is made that the operation mode is the non-burst mode.

The method used to suspend the switching is not restricted in particular. For example, the output of the driver 306 may preferably be fixed to the low level. Specifically, the pulse signal S1 may be masked using the shutdown signal SDN. Also, a low-side transistor (not shown) of a push-pull output stage of the driver 306 may be fixed to the on state according to the shutdown signal SDN.

Furthermore, when judgment is made that the operation mode is the burst mode, the automatic shutdown circuit 310 shuts down at least a part of its circuit block. Specifically, the shutdown signal SDN is supplied to at least a part of its circuit block, and its operation is suspended during a time period in which the shutdown signal SDN is set to the high level. The method used to perform the shutdown operation is not restricted in particular. For example, such a shutdown operation can be performed by cutting off the power supply voltage or otherwise cutting off the bias voltage. Also, in a case in which such a circuit block is configured as a digital circuit, the shutdown operation can be performed by cutting off a clock signal or the like.

On the other hand, a part of the automatic shutdown circuit 310 configured to detect a transition from the burst mode to the non-burst mode is preferably not shut down, i.e., is preferably maintained in the active state. That is to say, a part of or all of the other circuits is or are preferably shut down.

Figure 3:
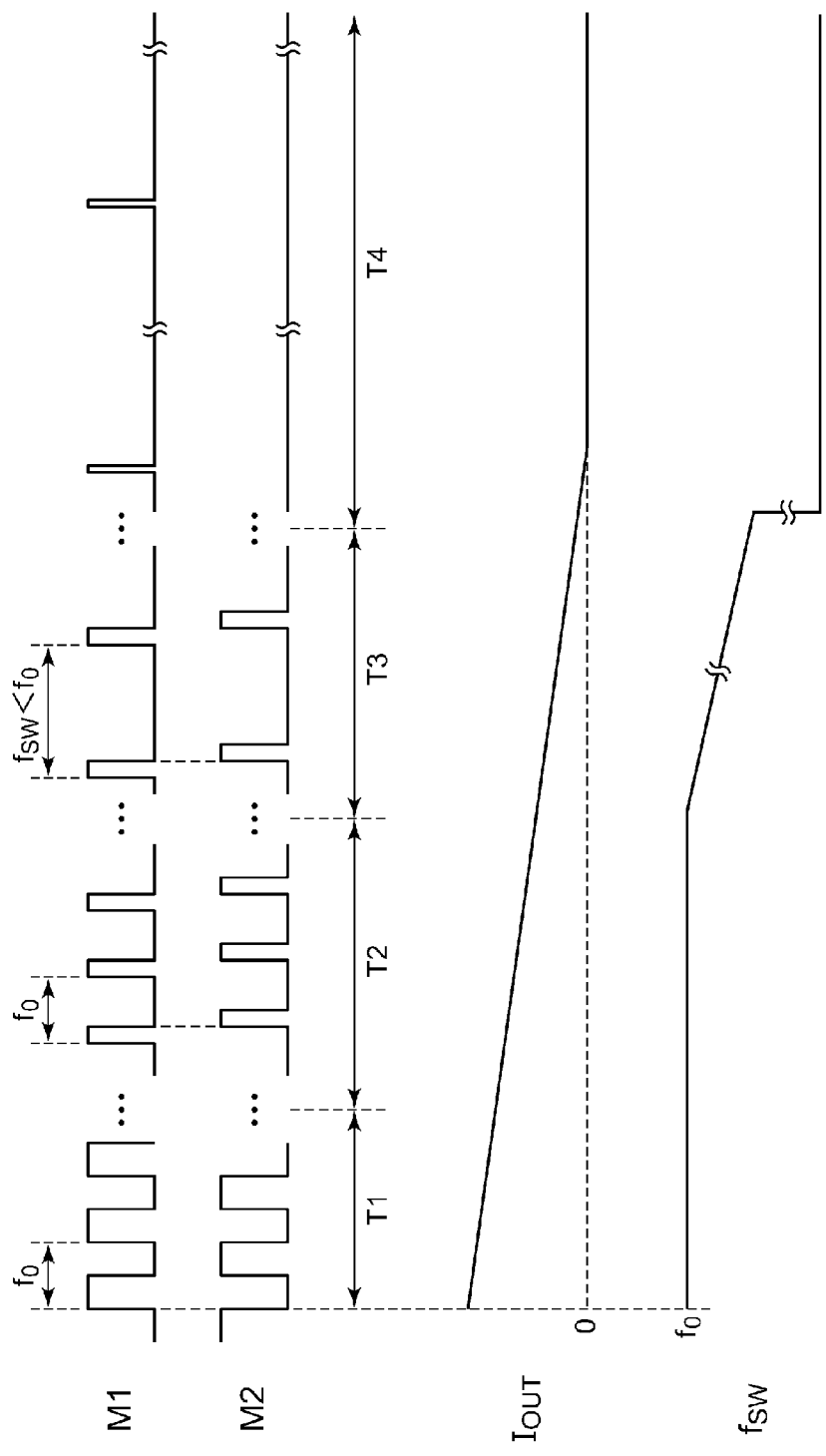
FIG. 3 is an operation waveform diagram showing the operation of the DC/DC converter shown in FIG. 2.

The above is the basic configuration of the DC/DC converter 200. Next, description will be made regarding the operation thereof. FIG. 3 is an operation waveform diagram showing the operation of the DC/DC converter 200 shown in FIG. 2. With the passage of time, the load current $I_{OUT}$ decreases. The time periods T1 through T3 correspond to the non-burst mode. The time period T4 corresponds to the burst mode. In the time periods T1 and T2, the primary-side controller 202 switches on and off the switching transistor M1 with a basic frequency $f_0$. In the period $\tau 1$, the DC/DC converter 200 operates in the continuous mode. In the period $\tau 2$, the DC/DC converter 200 operates in the discontinuous mode. In the period T3, the switching frequency $f_{SW}$ of the switching transistor M1 is reduced according to a reduction in the load current. When the load state becomes a light load state or otherwise a zero load state, the primary-side controller 202 is switched to the burst mode. It should be noted that the operation mode is directly switched from the discontinuous mode period $\tau 2$ to the burst mode period T4 without a transition via the period T3 in which the switching frequency $f_{SW}$ is reduced.

A voltage waveform occurs across the synchronous rectification transistor M2 according to the on/off operation of the switching transistor M1 at the primary side. With such an arrangement, the automatic shutdown circuit 310 judges, based on the drain-source voltage $V_{DS}$ of the synchronous rectification transistor M2, whether or not the switching transistor M1 is performing switching, and whether the operation mode is the burst mode or the non-burst mode.

When the transition to the burst mode is detected, the automatic shutdown circuit 310 sets the shutdown signal SDN to the high level so as to suspend the switching of the synchronous rectification transistor M2, and so as to set a circuit block that is not required to operate to a shutdown state (which will also be referred to as the "sleep state").

Subsequently, when a transition from the burst mode to the non-burst mode is detected, the automatic shutdown circuit 310 sets the shutdown signal SDN to the low level so as to restart the switching of the synchronous rectification transistor M2.

The above is the operation of the DC/DC converter 200 including the synchronous rectification controller 300 according to the embodiment.

With the present embodiment, during a period when the primary-side controller 202 operates in the burst mode, the switching of the synchronous rectification transistor M2 is suspended. In this state, the current $I_S$ is supplied to the output capacitor C1 via the body diode $D_{M2}$ of the synchronous rectification transistor M2. That is to say, by operating the secondary-side circuit as a diode rectification circuit, such an arrangement is capable of reducing its switching loss, thereby providing reduced power consumption.

As a comparison technique, for example, an approach is conceivable in which the primary-side controller 202 notifies the synchronous rectification controller 300 of the information with respect to the operation mode. Such an approach requires a circuit configured to transmit a notice signal that provides the information with respect to the operation mode. However, in order to transmit and receive signals between the primary side and the secondary side, an insulated converter requires additional components such as a photocoupler or a DC blocking capacitor. Accordingly, from the viewpoint of the cost of the circuit, it is difficult to employ this approach. With the synchronous rectification controller 300 according to the embodiment, the operation mode autonomously and automatically transits to the shutdown mode or otherwise returns from the shutdown mode according to the voltage across the synchronous rectification transistor M2. Thus, such an arrangement requires no circuit component for transmitting and receiving an additional signal between the primary-side controller 202 and the synchronous rectification controller 300, which is an advantage.

Furthermore, in the burst mode, by shutting down at least a part of the circuit block of the synchronous rectification controller 300, such an arrangement is capable of reducing the operating current of the synchronous rectification controller 300, thereby providing further reduced power consumption.

The present invention encompasses various kinds of specific embodiments which can be understood as the block diagram shown in FIG. 2. Description will be made blow regarding a specific example.

Figure 4:
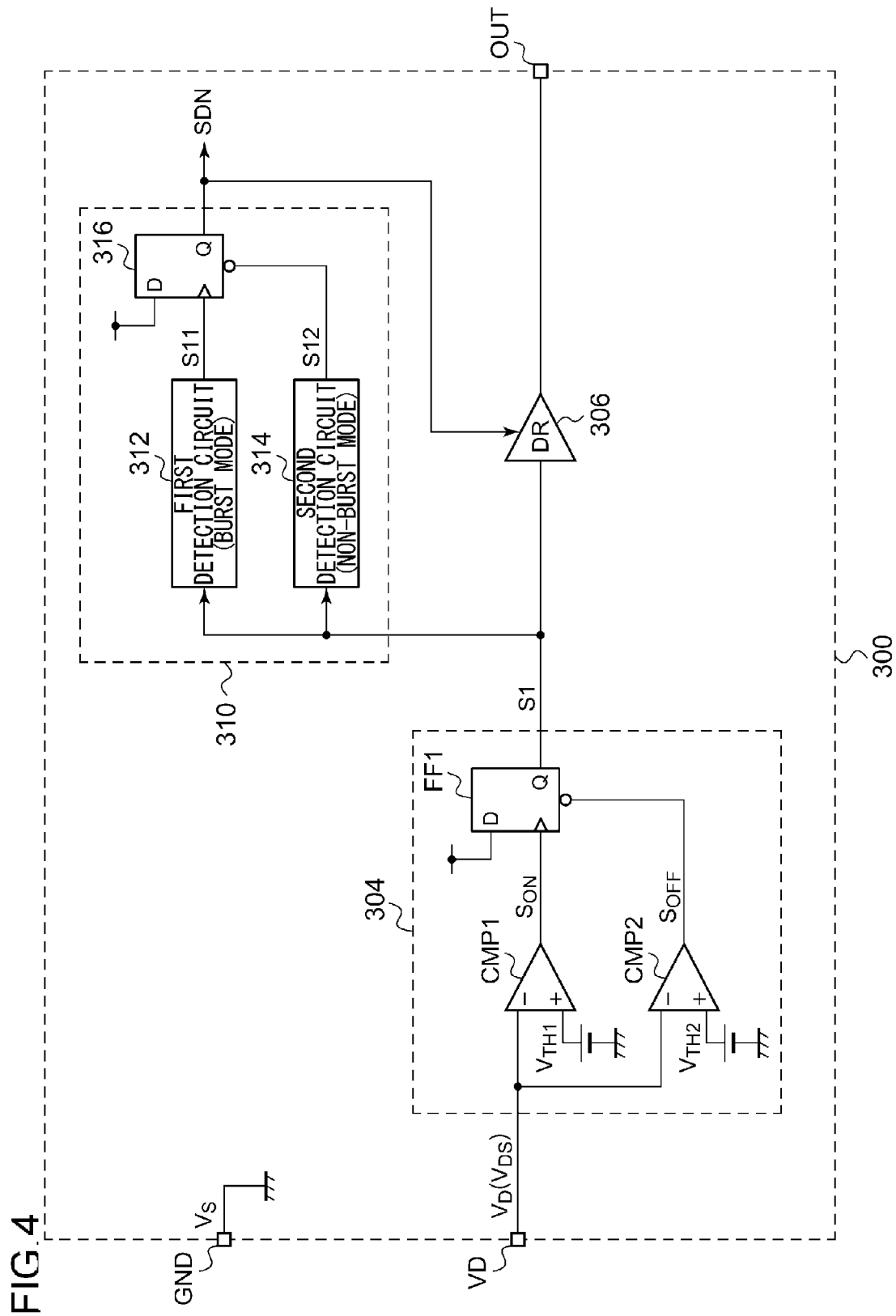
FIG. 4 is a circuit diagram showing an example configuration of the synchronous rectification controller.

FIG. 4 is a circuit diagram showing an example configuration of the synchronous rectification controller 300.

The pulse generator 304 includes a first comparator CMP1, a second comparator CMP2, and a D flip-flop FF1. The GND terminal of the synchronous rectification controller 300 is connected to the source of the synchronous rectification transistor M2. Accordingly, in the synchronous rectification controller 300, the voltage $V_D$ at the VD terminal corresponds to the drain-source voltage of the synchronous rectification transistor M2.

As described above, (i) when the switching transistor M1 turns off, the pulse generator 304 sets the pulse signal S1 to the first state (high level). (ii) When the current $I_S$ that flows through the secondary winding W2 becomes substantially zero in the on period of the synchronous rectification transistor M2, the pulse generator 304 sets the pulse signal S1 to the second state (low level).

The first comparator CMP1 is provided in order to detect whether or not the switching transistor M1 turns off. The first comparator CMP1 compares the drain voltage (drain-source voltage) $V_D$ at the VD terminal with a first threshold voltage $V_{TH1}$ configured as a predetermined positive voltage. When the drain voltage $V_D$ crosses the first threshold voltage $V_{TH1}$, the first comparator CMP1 asserts (set to high level) a turn-on signal (set signal) $S_{ON}$. Specifically, when the drain voltage $V_D$ becomes lower than the first threshold voltage $V_{TH1}$, i.e., when the drain-source voltage $V_{DS}$ becomes a negative voltage, the turn-on signal $S_{ON}$ is set to the high level. The turn-on signal $S_{ON}$ is input to a clock terminal of the D flip-flop FF1. With such an arrangement, the pulse signal S1 is set to the high level in response to a positive edge of the turn-on signal $S_{ON}$. Also, an RS flip-flop may be employed instead of the D flip-flop FF1.

The second comparator CMP2 is provided in order to detect (ii) whether or not the current $I_S$ that flows through the secondary winding W2 becomes substantially zero in the on period of the synchronous rectification transistor M2. In the off period of the switching transistor M1, the current $I_S$ flows from the source to the drain of the synchronous rectification transistor M2. In this state, the drain-source voltage $V_{DS}$ is a negative voltage having an absolute value that corresponds to the current value of the current $I_S$. Using this mechanism, the second comparator CMP2 compares the drain voltage $V_D$ with a negative threshold voltage $V_{TH2}$ set to a negative value in the vicinity of zero. When the drain voltage $V_D$ becomes higher than the threshold voltage $V_{TH2}$, the second comparator CMP2 asserts (set to low level) the turn-off signal (reset signal) $S_{OFF}$. The turn-off signal $S_{OFF}$ is input to a reset terminal (logical inversion) of the flip-flop FF1. With such an arrangement, the pulse signal S1 is set to the low level according to a negative edge of the turn-off signal $S_{OFF}$.

FIGS. 5A and 5B are operation waveform diagrams showing the operations of the pulse generator 304 in the continuous mode and the discontinuous mode, respectively.

Description will be made returning to FIG. 4. The automatic shutdown circuit 310 does not directly monitor the voltage $V_{DS}$ across the synchronous rectification transistor M2. Instead, the automatic shutdown circuit 310 judges the operation mode of the primary-side controller 202 based on the pulse signal S1 generated according to the voltage $V_{DS}$.

The automatic shutdown circuit 310 includes a first detection circuit 312, a second detection circuit 314, and an output circuit 316. The first detection circuit 312 detects, based on the pulse signal S1, whether or not the operation mode is the burst mode. When judgment has been made that the operation mode is the burst mode, the first detection circuit 312 asserts a first detection signal S11. The second detection circuit 314 detects, based on the pulse signal S1, whether or not the operation mode is the non-burst mode. When judgment has been made that the operation mode is the non-burst mode, the second detection circuit 314 asserts a second detection signal S12. The output circuit 316 generates the shutdown signal SDN which switches its state according to the first detection signal S11 and the second detection signal S12. The output circuit 316 may be configured as a D flip-flop or otherwise an RS flip-flop.

When a predetermined first period τ1 has elapsed in a state in which the pulse signal S1 is not generated, i.e., in a state in which there is no signal transition in the pulse signal S1, and accordingly, when the pulse signal S1 remains at a constant level for the predetermined first period τ1, the first detection circuit 312 judges that the operation mode is the burst mode. That is to say, the first detection circuit 312 may be configured as an analog timer circuit or otherwise a digital timer circuit. On the other hand, when a predetermined number of pulse signals S1 are continuously generated, the second detection circuit 314 judges that the operation mode is the non-burst mode.

Figure 6:
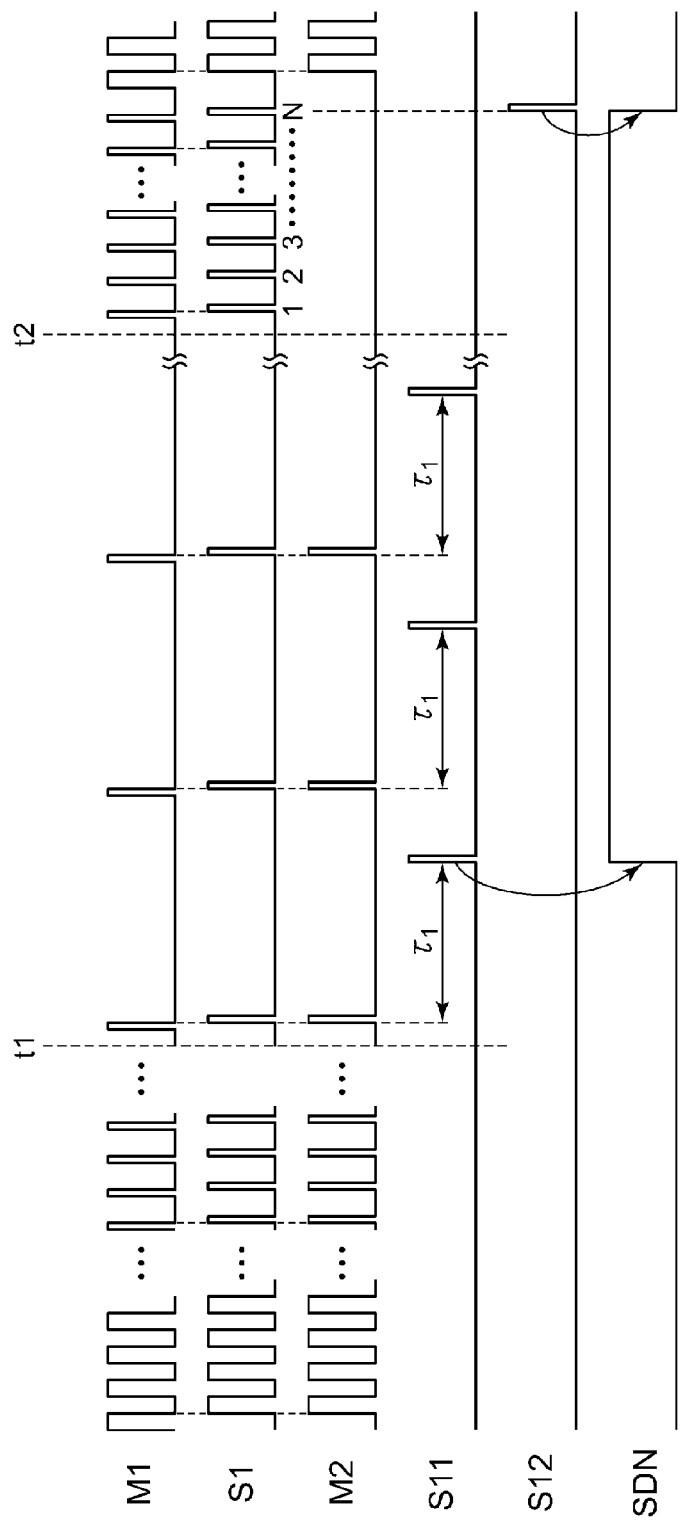
FIG. 6 is a diagram for describing the operation of an automatic shutdown circuit shown in FIG. 4.

FIG. 6 is a diagram for describing the operation of the automatic shutdown circuit 310 shown in FIG. 4. The pulse signal S1 is generated every time the switching transistor M1 is switched on and off. After the time point t1, the operation mode is set to the burst mode. In the burst mode, the pulse signal S1 is generated with a reduced frequency. Specifically, the time interval of generation of the pulse signal S1 becomes longer than the first time period τ1. In this state, the first detection signal S11 is asserted, and accordingly, the shutdown signal SDN is set to the high level, which suspends the switching of the synchronous rectification transistor M2.

After the operation mode is returned to the non-burst mode at the time point t2, the switching transistor M1 continuously switches on and off. In this state, the time interval of generation of the pulse signal S1 becomes shorter than the first time period τ1. When the number of continuously generated pulse signals S1 exceeds a predetermined number N, the second detection signal S12 is asserted, and accordingly, the shutdown signal SDN is set to the low level, which restarts the switching of the synchronous rectification transistor M2.

Figure 7:
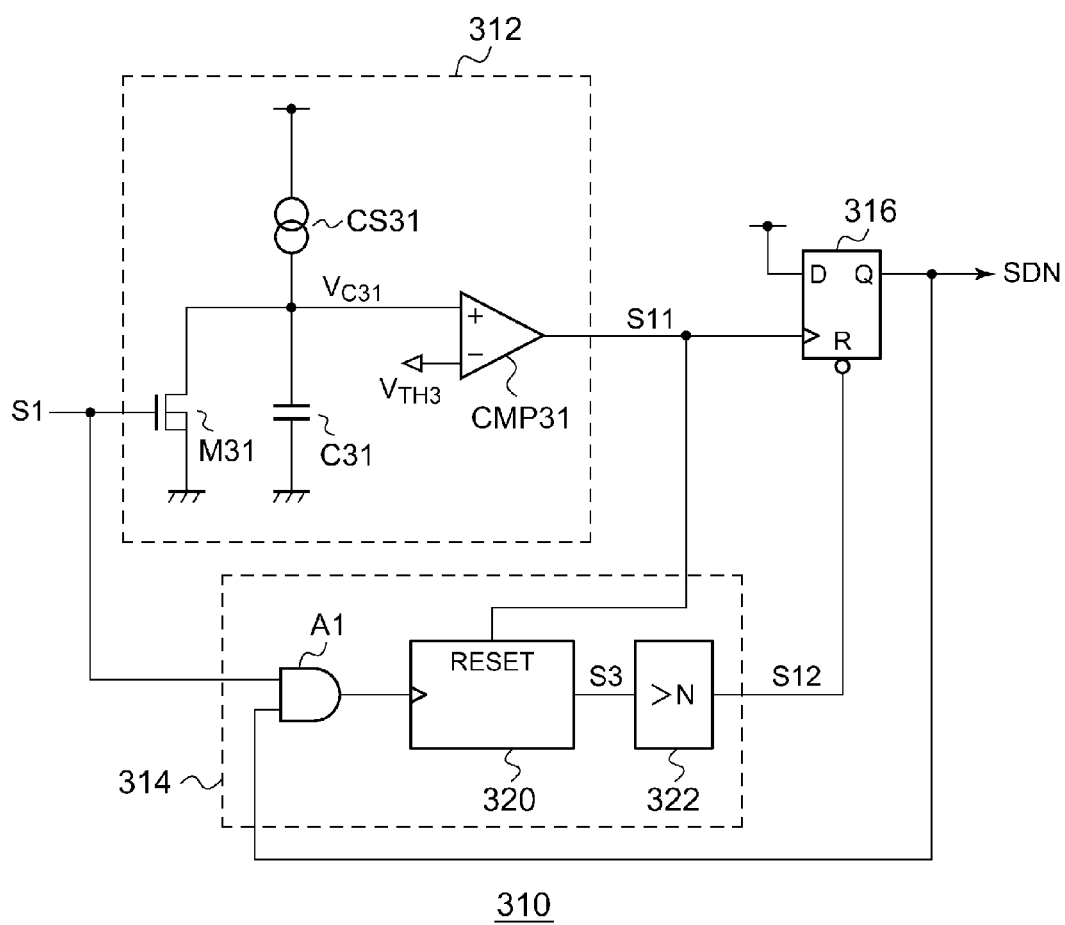
FIG. 7 is a circuit diagram showing an example configuration of the automatic shutdown circuit shown in FIG. 4.

FIG. 7 is a circuit diagram showing an example configuration of the automatic shutdown circuit 310 shown in FIG. 4. The first detection circuit 312 includes a capacitor C31, a current source CS31, a discharge circuit M31, and a comparator CMP31. The current source CS31 supplies a current to the capacitor C31. The discharge circuit M31 discharges the capacitor C31 according to the pulse signal S1. For example, the discharge circuit M31 may be configured as a transistor. The comparator CMP31 compares the voltage $V_{C31}$ across the capacitor C31 with a predetermined threshold voltage $V_{TH3}$. When the voltage $V_{C31}$ across the capacitor C31 exceeds the threshold voltage $V_{TH3}$, the comparator CMP31 asserts (set to high level) the first detection signal S11.

It should be noted that the first detection circuit 312 may preferably be operated only in the non-burst mode. Thus, during a period when the shutdown signal SDN is asserted, the first detection circuit 312 may be set to the shutdown state.

The first detection circuit 312 may be configured using a digital timer (digital counter). In this case, the digital counter may preferably count up (or otherwise count down) a clock signal, and the digital counter may preferably be reset according to the pulse signal S1. With such an arrangement, when the count value reaches a predetermined value that corresponds to the first time period τ1, the first detection circuit 312 may preferably assert the first detection signal S11.

The second detection circuit 314 includes a counter 320 and a digital comparator 322. The counter 320 counts the pulse signal S1. Furthermore, when the first detection signal S11 is asserted, the counter 320 is reset. When the count value S3 of the counter 320 reaches the predetermined value N, the digital comparator 322 asserts (sets to low level) the second detection signal S12.

The second detection circuit 314 may preferably be operated only during a period in which the shutdown signal SDN indicates the burst mode. Thus, an AND gate A1 generates the logical AND of the shutdown signal SDN and the pulse signal S1, and outputs the logical AND thus generated to the counter 320. With such an arrangement, the count operation is not performed during a period (non-burst period) in which the shutdown signal SDN is set to the low level, thereby providing reduced power consumption.

Figure 8:
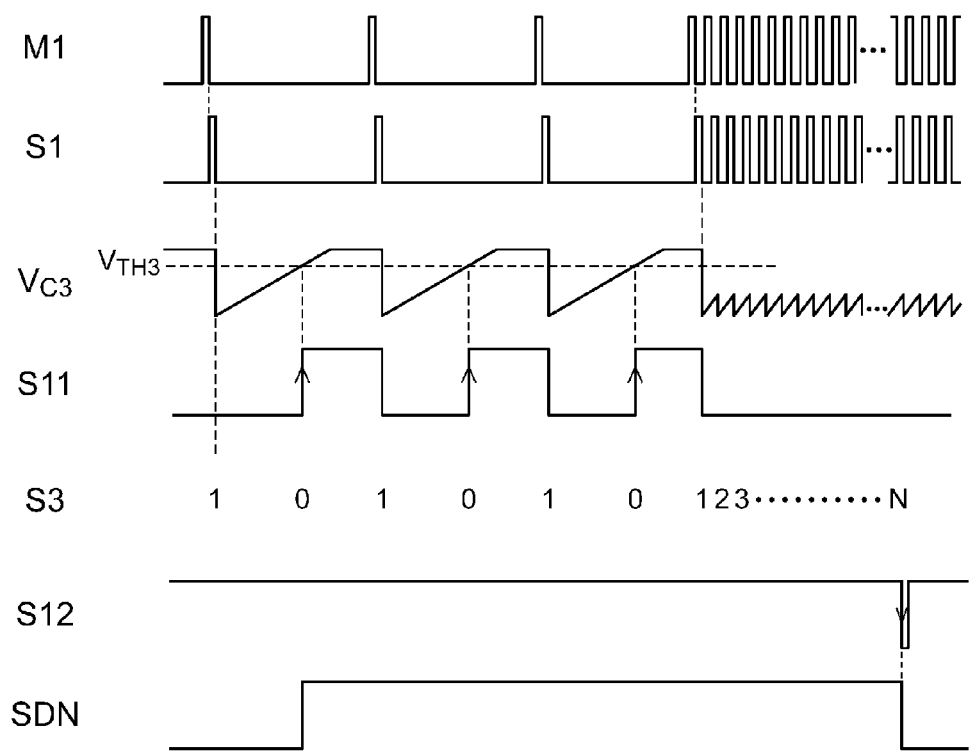
FIG. 8 is an operation waveform diagram showing the operation of the automatic shutdown circuit shown in FIG. 7.

FIG. 8 is an operation waveform diagram showing the operation of the automatic shutdown circuit 310 shown in FIG. 7. At the time point t1, the operation mode transits from the non-burst mode to the burst mode. In the burst mode, the time interval of generation of the pulse signal S1 is increased. Accordingly, the voltage $V_{C3}$ across the capacitor C3 increases with the passage of time. When the voltage $V_{C3}$ exceeds the threshold voltage $V_{TH3}$, the first detection signal S11 is asserted. When the first detection signal S11 is asserted, the shutdown signal SDN is set to the high level.

At the time point t2, the operation mode returns from the burst mode to the non-burst mode. In this mode, the switching transistor M1 continuously switches on and off, and accordingly, the time interval of generation of the pulse signal S1 is reduced. In the non-burst mode, the first detection signal S11 is not asserted. In this mode, the counter 320 is not reset, and accordingly, the counter 320 continues counting up. When the count value S3 reaches the predetermined value N, the second detection signal S12 is asserted (set to low level), which switches the shutdown signal SDN to the low level. The above is the operation of the automatic shutdown circuit 310 shown in FIG. 7.

[Usage]

Next, description will be made regarding the usage of the DC/DC converter 200 described in the embodiment.

Figure 9:
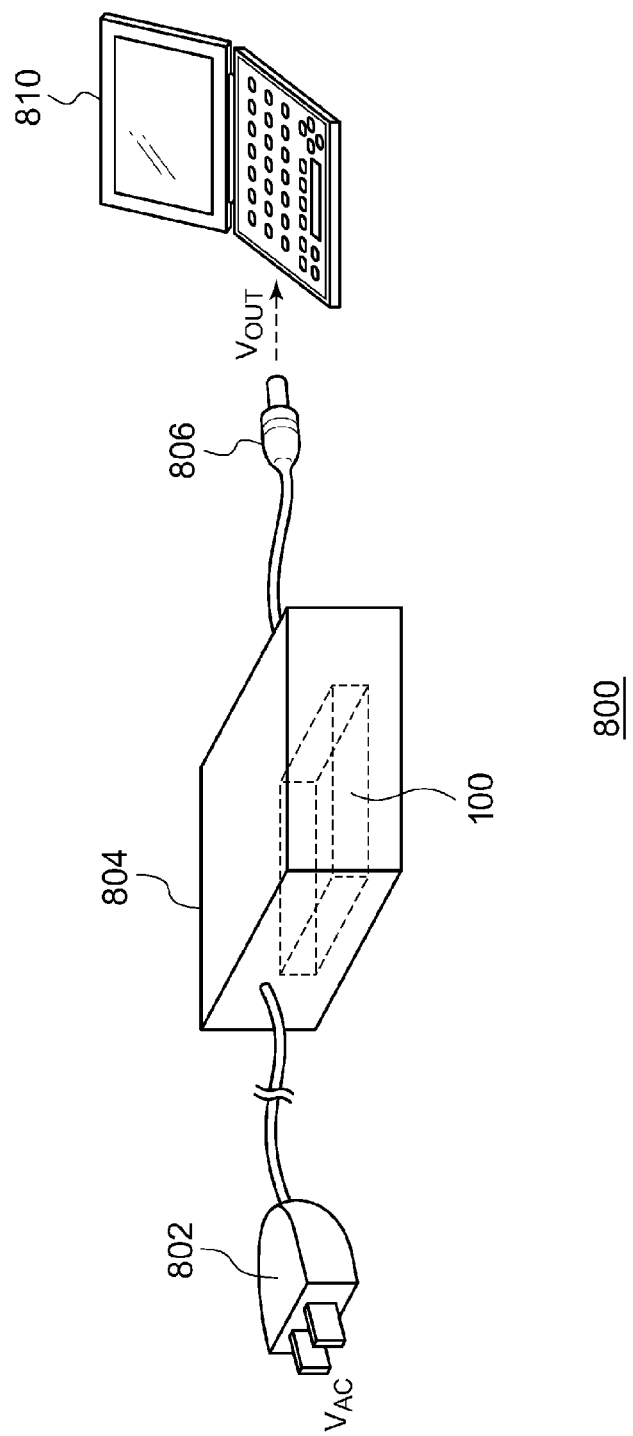
FIG. 9 is a diagram showing an AC adapter including an AC/DC converter.

FIG. 9 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ generated by the AC/DC converter 100 is supplied to an electronic device 810 via the connector 806. Examples of such an electronic device 810 includes laptop PCs, digital still cameras, digital video cameras, cellular phones, portable audio players, and the like.

Figure 10A:
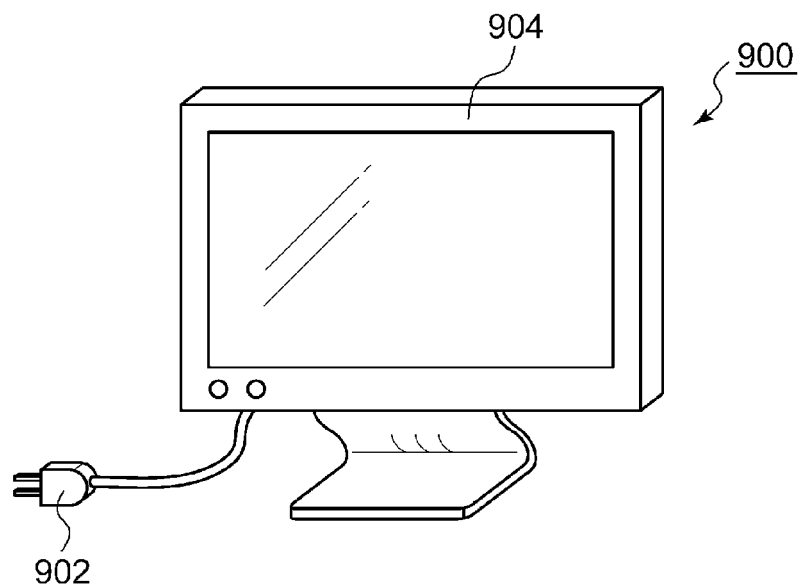
FIGS. 10A and 10B are diagrams each showing an electronic device including an AC/DC converter.
Figure 10B:
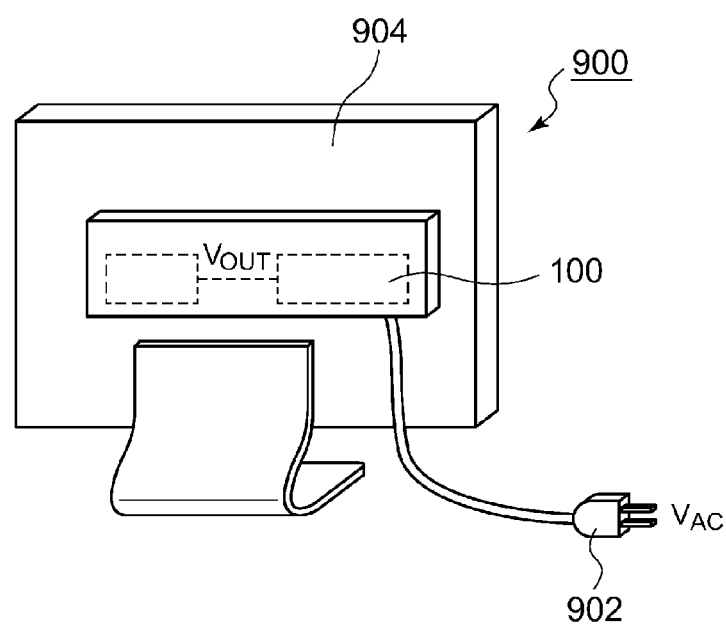

FIGS. 10A and 10B are diagrams each showing an electronic device 900 including the AC/DC converter 100. The electronic device 900 shown in FIGS. 10A and 10B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 receives commercial AC voltage $V_{AC}$ from an unshown electrical outlet. The AC/DC converter 100 is mounted within the housing 904. The DC output voltage $V_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

When a state in which the pulse signal S1 is continuously generated continues for a predetermined second time period τ2, the automatic shutdown circuit 310 may judge that the operation mode is the non-burst mode. In this case, a digital timer circuit or otherwise an analog timer circuit may be employed instead of the counter 320. Such an analog timer may be configured in the same manner as that of the first detection circuit 312 shown in FIG. 7. The first detection signal S11 may preferably be input to the transistor M31 configured as the discharge circuit.

[Second Modification]

Description has been made in the embodiment regarding an arrangement in which the automatic shutdown circuit 310 judges the operation mode of the primary-side controller 202 based on the pulse signal S1. However, the present invention is not restricted to such an arrangement. Also, the operation mode may be judged by means of other methods or other configurations based on the voltage across the synchronous rectification transistor M2.

For example, the automatic shutdown circuit 310 may judge the operation mode of the primary-side controller 202 based on at least one of or otherwise both of the on signal $S_{ON}$ and the off signal $S_{OFF}$ instead of the pulse signal S1. In this case, instead of the pulse signal S1, the on signal $S_{ON}$ (or the off signal $S_{OFF}$) may be supplied to the automatic shutdown circuit 310 shown in FIG. 4.

That is to say, the automatic shutdown circuit 310 may judge the operation mode of the primary-side controller 202 based on at least one comparison result (e.g., $S_{ON}$, $S_{OFF}$, or other signals) obtained by comparing the voltage $V_{DS}$ across the synchronous rectification transistor M2 with at least one threshold voltage ($V_{TH1}$, $V_{TH2}$, or other threshold voltages).

In this case, when no transition of a signal indicative of the comparison result occurs for the first time period τ1, the automatic shutdown circuit 310 may judge that the operation mode is the burst mode. When a transition of the signal indicative of the comparison result continuously occurs for a predetermined number of times, the automatic shutdown circuit 310 may judge that the operation mode is the non-burst mode. Also, when a state in which a transition of the signal indicative of the comparison result continuously occurs continues for the predetermined second time period τ2, the automatic shutdown circuit 310 may judge that the operation mode is the non-burst mode.

[Third Modification]

Figure 11:
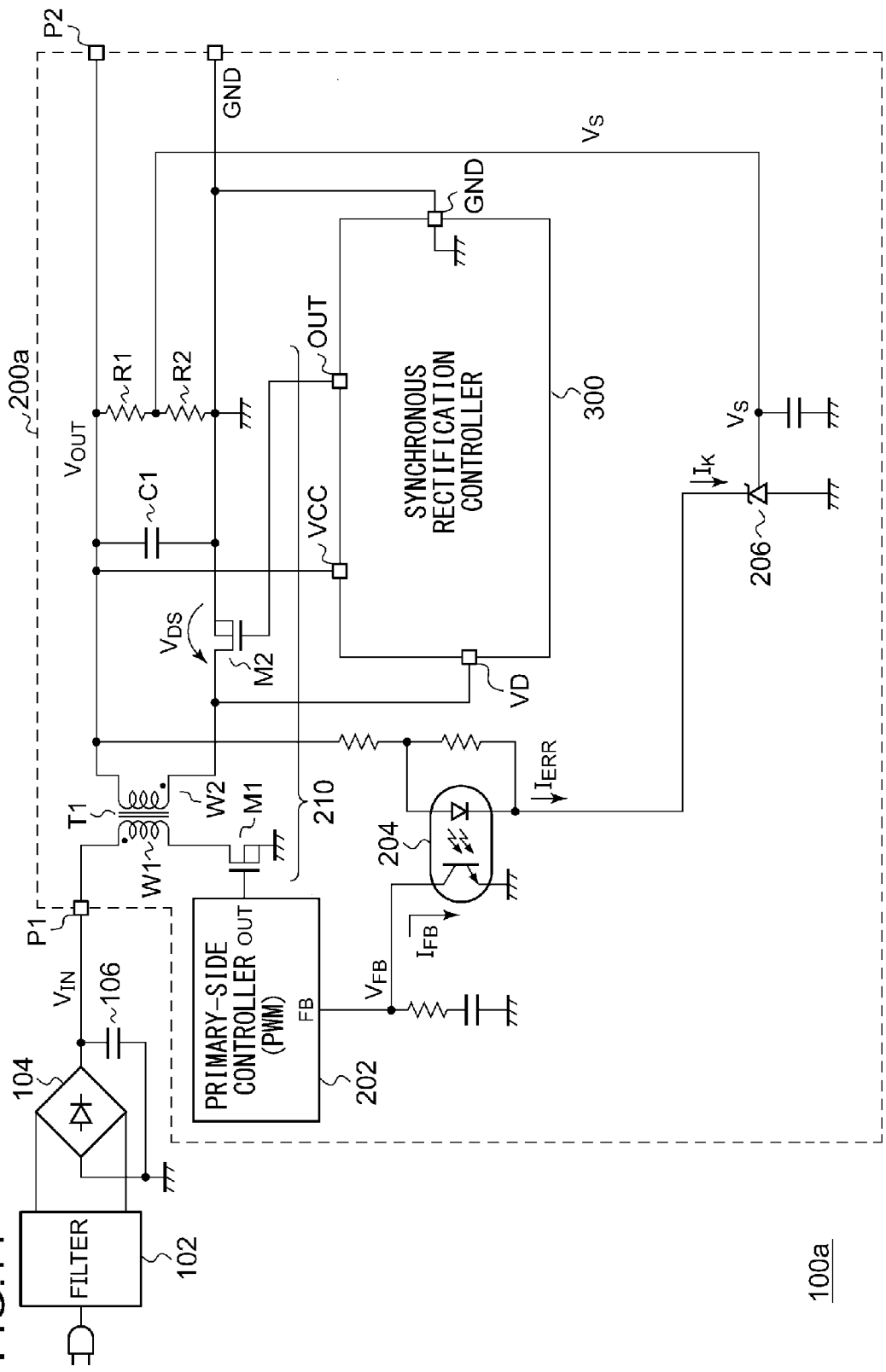
FIG. 11 is a circuit diagram showing a DC/DC converter according to a third modification.

Description has been made in the embodiment regarding an arrangement in which the synchronous rectification transistor M2 is arranged on the output terminal P2 side of the secondary winding W2. Also, the synchronous rectification transistor M2 may be arranged between the secondary winding W2 and the ground. FIG. 11 is a circuit diagram showing a DC/DC converter 200a according to a third modification. The output voltage $V_{OUT}$ of the DC/DC converter 200a is supplied to the VCC terminal of the synchronous rectification controller 300. The GND terminal is connected to the source of the synchronous rectification transistor M2, and is grounded. The VD terminal is connected to the drain of the synchronous rectification transistor M2, and the OUT terminal is connected to the gate of the synchronous rectification transistor M2. The synchronous rectification controller 300 has the same internal configuration as that shown in FIG. 2. Such a configuration provides the same effects as those provided by the embodiment.

[Fourth Modification]

Description has been made in the embodiment regarding a flyback converter. Also, the present invention is applicable to a forward converter. In this case, multiple synchronous rectification transistors are arranged on the secondary side of the transformer T1. A synchronous rectification controller may be configured to switch on and off the multiple synchronous rectification transistors. Also, such a converter may be configured as a quasi-resonant converter.

[Fifth Modification]

At least one of the switching transistor or the synchronous rectification transistor may be configured as a bipolar transistor or an IGBT.

While the preferred embodiments of the present invention have been described using specific terms, such description is for illustrative purposes only, and it is to be understood that changes and variations may be made without departing from the spirit or scope of the appended claims.

What is claimed is:

1. A synchronous rectification controller that is arranged on a secondary side of an insulated synchronous rectification DC/DC converter, and that controls a synchronous rectification transistor, the synchronous rectification controller comprising:
    a pulse generator that generates a pulse signal configured as an instruction to switch on and off the synchronous rectification transistor based on at least a voltage across the synchronous rectification transistor;
    a driver that switches on and off the synchronous rectification transistor according to the pulse signal; and
    an automatic shutdown circuit that judges, based on the voltage across the synchronous rectification transistor, whether a primary-side controller that controls a switching transistor at a primary side of the DC/DC converter is operating in a burst mode or a non-burst mode, and that instructs the driver to suspend switching of the synchronous rectification transistor when judgment is made that an operation mode of the primary-side controller is the burst mode,
    wherein, when a predetermined first time period continues in a state in which the pulse signal is not generated, the automatic shutdown circuit judges that the operation mode is the burst mode.

2. The synchronous rectification controller according to claim 1, wherein, when judgment has been made that the operation mode is the burst mode, the automatic shutdown circuit shuts down at least a part of a circuit block thereof.

3. The synchronous rectification controller according to claim 1, wherein, when a predetermined number of the pulse signals are continuously generated, the automatic shutdown circuit judges that the operation mode is the non-burst mode.

4. The synchronous rectification controller according to claim 1, wherein, when a state in which the pulse signal is continuously generated continues for a second time period, the automatic shutdown circuit judges that the operation mode is the non-burst mode.

5. A synchronous rectification controller that is arranged on a secondary side of an insulated synchronous rectification DC/DC converter, and that controls a synchronous rectification transistor, the synchronous rectification controller comprising:

a pulse generator that generates a pulse signal configured as an instruction to switch on and off the synchronous rectification transistor based on at least a voltage across the synchronous rectification transistor;

a driver that switches on and off the synchronous rectification transistor according to the pulse signal; and an automatic shutdown circuit that judges, based on the voltage across the synchronous rectification transistor, whether a primary-side controller that controls a switching transistor at a primary side of the DC/DC converter is operating in a burst mode or a non-burst mode, and that instructs the driver to suspend switching of the synchronous rectification transistor when judgment is made that an opration mode of the primary-side controller is the burst mode, wherein, when a transition of a signal indicative of a comparison result obtained by comparing the voltage across the synchronous rectification transistor with at least one threshold voltage does not occur for a predetermined first time period, the automatic shutdown circuit judges that the operation mode is the burst mode.

6. The synchronous rectification controller according to claim 5, wherein, when a transition of a signal indicative of the comparison result continuously occurs for a predetermined number of times, the automatic shutdown circuit judges that the operation mode is the non-burst mode.

7. The synchronous rectification controller according to claim 5, wherein, when a transition of a signal indicative of the comparison result continuously occurs for a predetermined second time period, the automatic shutdown circuit judges that the operation mode is the non-burst mode.

8. A synchronous rectification controller that is arranged on a secondary side of an insulated synchronous rectification DC/DC converter, and that controls a synchronous rectification transistor, the synchronous rectification controller comprising:

a pulse generator that generates a pulse signal configured as an instruction to switch on and off the synchronous rectification transistor based on at least a voltage across the synchronous rectification transistor;

a driver that switches on and off the synchronous rectification transistor according to the pulse signal; and an automatic shutdown circuit that judges, based on the voltage across the synchronous rectification transistor, whether a primary-side controller that controls a switching transistor at a primary side of the DCX/DC converter is operating in a burst mode or a non-burst mode, and that instructs the driver to suspend switching of the synchronous rectification transistor when judgment is made that an operation mode of the prima-side controller is the burst mode, wherein the automatic shutdown circuit comprises:

a first detection circuit that asserts a first detection signal when judgment has been made that the operation mode is the burst mode;

a second detection circuit that asserts a second detection signal when judgment has been made that the operation mode is the non-burst mode; and an output circuit that generates a shutdown signal having a state that transits according to the first detection signal and the second detection signal.

9. The synchronous rectification controller according to claim 8, wherein the first detection circuit comprises:

a capacitor having one end supplied with a fixed electric potential;

a current source that supplies a current to the capacitor;

a discharge circuit that discharges the capacitor according to the pulse signal; and a comparator that compares a voltage across the capacitor with a predetermined threshold voltage, and that asserts the first detection signal when the voltage across the capacitor exceeds the threshold voltage.

10. The synchronous rectification controller according to claim 8, wherein the second detection circuit comprises a counter that counts the pulse signal, and that is reset when the first detection signal is asserted, and wherein, when a count value of the counter reaches a predetermined value, the second detection signal is asserted.

11. A synchronous rectification controller that is arranged on a secondary side of an insulated synchronous rectification DC/DC converter, and that controls a synchronous rectification transistor, the synchronous rectification controller comprising:

a pulse generator that generates a pulse signal configured as an instruction to switch on and off the synchronous rectification transistor based on at least a voltage across the synchronous rectification transistor;

a driver that switches on and off the synchronous rectification transistor according to the pulse signal; and an automatic shutdown circuit that judges, based on the voltage across the synchronous rectification transistor, whether a primary-side controller that controls a switching transistor at a primary side of the DC/DC converter is operating in a burst mode or a non-burst mode, and that instructs the driver to suspend switching of the synchronous rectification transistor when judgment is made that an operation mode of the primary-side controller is the burst mode, wherein, when the voltage across the synchronous rectification transistor crosses a first threshold voltage, the pulse generator sets the pulse signal to an on level configured as an instruction to switch on the synchronous rectification transistor, and wherein, when the voltage across the synchronous rectification transistor crosses a second threshold voltage, the pulse generator sets the pulse signal to an off level configured as an instruction to switch off the synchronous rectification transistor.

12. The synchronous rectification controller according to claim 1, monolithically integrated on a single semiconductor substrate.

13. An insulated synchronous rectification DC/DC converter comprising:

a transformer comprising a primary winding and a secondary winding;

a switching transistor connected to the primary winding of the transformer;

a synchronous rectification transistor connected to the secondary winding of the transformer;

a photocoupler;

a primary-side controller that is connected to an output side of the photocoupler, and that switches on and off the switching transistor according to a feedback signal received from the photocoupler, the synchronous rectification controller according to claim 1, that controls the synchronous rectification transistor; and a feedback circuit that is connected to an input side of the photocoupler, and that generates an error current that corresponds to an output voltage of the DC/DC converter.

14. A power supply apparatus comprising:

a filter that filters a commercial AC voltage;

a diode rectifier circuit that full-wave rectifies an output voltage of the filter;
a smoothing capacitor that smoothes an output voltage of the diode rectifier circuit so as to generate a DC input voltage; and
the DC/DC converter according to claim 13, that steps down the DC input voltage, and that supplies the DC input voltage thus stepped down to a load.

15. An electronic device comprising:
a load;
a filter that filters a commercial AC voltage;
a diode rectifier circuit that full-wave rectifies an output voltage of the filter;
a smoothing capacitor that smoothes an output voltage of the diode rectifier circuit so as to generate a DC input voltage; and
the DC/DC converter according to claim 13, that steps down the DC input voltage, and that supplies the DC input voltage thus stepped down to the load.

16. A power supply adapter comprising:
a filter that filters a commercial AC voltage;
a diode rectifier circuit that full-wave rectifies an output voltage of the filter;
a smoothing capacitor that smoothes an output voltage of the diode rectifier circuit so as to generate a DC input voltage; and
the DC/DC converter according to claim 13, that steps down the DC input voltage, and that supplies the DC input voltage thus stepped down to a load.

17. The synchronous rectification controller according to claim 5, wherein, when judgment has been made that the operation mode is the burst mode, the automatic shutdown circuit shuts down at least a part of a circuit block thereof.

18. The synchronous rectification controller according to claim 8, wherein, when judgment has been made that the operation mode is the burst mode, the automatic shutdown circuit shuts down at least a part of a circuit block thereof.

19. The synchronous rectification controller according to claim 11, wherein, when judgment has been made that the operation mode is the burst mode, the automatic shutdown circuit shuts down at least a part of a circuit block thereof.

20. The synchronous rectification controller according to claim 5, monolithically integrated on a single semiconductor substrate.

\* \* \* \* \*